United States Patent [19]

Tausch

[11] 4,065,206

[45] Dec. 27, 1977

[54] BALLISTIC PROTECTED PERISCOPE CONSTRUCTION

[75] Inventor: Gerald Tausch, Salem, Ohio

[73] Assignee: Miller-Holzwarth, Inc., Salem, Ohio

[21] Appl. No.: 697,933

[22] Filed: June 21, 1976

[51] Int. Cl.² ............................................. G02B 5/08
[52] U.S. Cl. ................................. 350/301; 350/287
[58] Field of Search ................ 350/52, 69, 286, 287, 350/301, 302, 307, 310, 320; 428/34, 38, 437

[56] References Cited

U.S. PATENT DOCUMENTS

| 2,361,050 | 10/1944 | Paddock | 350/301 X |
| 3,505,160 | 4/1970 | Michaels et al. | 428/34 X |
| 3,799,817 | 3/1974 | Van Laethem | 428/437 X |

Primary Examiner—F. L. Evans
Attorney, Agent, or Firm—Frease & Bishop

[57] ABSTRACT

A pair of transparent prismatic-shaped blocks are mounted within a protective housing which extends through an opening in an armored vehicle for safely viewing an exterior field of view from within the protected vehicle. Each of the blocks has a reflective surface and a viewing surface and are separated from each other by a void. The void is filled with an optical adhesive which remains soft and pliable and which bonds the pair of blocks together in this spaced relationship. The adhesive provides a shock isolation effect between the transparent block which is exposed to shock from enemy gunfire, etc., and the other block located within the vehicle. The cushioned adhesive-filled void reduces transmission of the shock waves between the blocks and prevents foreign objects from entering the void and distorting the optical viewing system. Alternately, the void may be filled with a laminate consisting of a plurality of layers of such cushioning adhesive and intervening transparent blocks or strips of solid material.

6 Claims, 5 Drawing Figures

BALLISTIC PROTECTED PERISCOPE CONSTRUCTION

BACKGROUND OF THE INVENTION

1. Field of the Invention

The invention relates to periscopes for observing an exterior field of view from within a protected structure, and particularly to a periscope for armored vehicles. More particularly, the invention relates too a periscope having internal ballistic protection preventing transmission of shock waves encountered by the exterior portion of the periscope from being transmitted through the periscope and propelling fractured pieces of the periscope into the interior of the vehicle.

2. Description of the Prior Art

Numerous periscope constructions have been developed and are in use for armed vehicles such as tanks. These periscopes contain various optical systems which enable the occupants to observe a field of view exterior of the vehicle without providing a direct opening through the armor for passage of projectiles, chemicals, liquids or other harmful materials. Many periscope constructions presently used on tanks consist of a single plastic block mounted within a protective housing which extends through an opening in the tank. The observer views an exterior field of view through window openings in diagonally opposite end portions of the block.

Even though the body of a periscope which provides the optical system is formed of solid plastic, it still exhibits ballistic problems. When a projectile strikes the exterior viewing window of the periscope, a shock wave is transmitted through the body and causes parts and pieces of the observer window and surrounding plastic body to fly out into the interior of the vehicle and strike the observer. All known periscopes having solid bodies forming the optical system exhibit this problem to one degree or another.

One approach to solving this shock wave transmission problem is to split the transparent periscope body into two sections and fill the void or space therebetween with an inert gas such as dry nitrogen to prevent the accumulation of moisture, condensation and dust. This gas filled space prevents transmission of shock waves therethrugh, but requires an airtight seal which is a weak point in the periscope construction. The seal often fails because of the harsh environment to which the periscope is subjected, as well as adding considerable cost to the periscope. Periscopes such as shown in U.S. Pat. Nos. 3,482,897 and 3,619,040 attempt to solve this shock wave transmission problem by such gas filled voids.

No periscope construction of which I am aware eliminates these problems in a simple, effective and inexpensive manner by formation of the optical transparent block into a pair of sections which are separated by an optical cushioning material which remains soft and pliable, to reduce the transmission of shock waves between the two sections.

SUMMARY OF THE INVENTION

Objectives of the invention include providing a periscope construction for an armored vehicle having improved ballistic protection contained within the periscope housing which prevents or greatly eliminates the transmission of shock waves through the periscope body and into the interior of the vehicle; providing such a periscope construction in which the optical system is formed of a pair of transparent generally prismatic-shaped blocks forming an object viewing section and an eyepiece viewing section, respectively, and in which the blocks are separated from direct contact with each other to form a shock absorbing gap therebetween; providing such a periscope construction in which the shock absorbing gap or void between the pair of viewing blocks is filled with an optical adhesive cushioning material which remains soft and pliable, which reduces the transmission of shock waves between the solid blocks and which mechanically mounts the block sections within a protective metal housing; providing such a periscope construction in which the shock absorbing gap may be filled with a laminate formed of a plurality of transparent solid blocks which are joined to each other and to the adjacent viewing blocks by strips of the optical adhesive, cushioning material; providing such a periscope construction in which the adhesive cushioning material is contained entirely within the housed periscope and is unaffected by moisture, dust and other foreign objects, and in which the thickness of the shock absorbing material is varied depending upon the size and configuration of the pair of transparent blocks between which it is located to provide varying amounts of shock absorption; and providing such an improved ballistic protected periscope construction which is of an extremely simple, rugged, efficient and inexpensive construction, which eliminates difficulties and solves problems, and satisfies needs which have long existed in the art.

These objectives and advantages are obtained by the improved ballistic protected periscope construction of the type having a protective housing and an optical system mounted within the housing in which the optical system includes a first transparent block of material forming an object viewing section having an object viewing surface, a first reflective surface and a first end surface; a second transparent block of material forming an eyepiece viewing section having an eyepiece viewing surface, a second reflective surface and a second end surface; the first and second transparent blocks being mounted at generally opposite ends of the protective housing with the first and second reflective surfaces and the object and eyepiece viewing surfaces being especially parallel with respect to each other and forming a parallelogram in cross section, with the first and second end surfaces being spaced from each other and forming a void therebetween; and shock absorbing means mounted within and filling the void between the first and second end surfaces of the first and second transparent blocks, with the shock absorbing means including at least a layer of soft and pliable optical adhesive which bonds the blocks together and reduces the transmission of shock waves between said blocks.

BRIEF DESCRIPTION OF THE DRAWING

Preferred embodiments of the invention - illustrative of the best mode in which applicant has contemplated applying the principles — are set forth in the following description and shown in the accompanying drawing, and are particularly and distinctly pointed out and set forth in the appended claims.

Similar numerals refer to similar parts throughout the drawing.

DESCRIPTION OF THE PREFERRED EMBODIMENTS

First Embodiment

Figure 1:
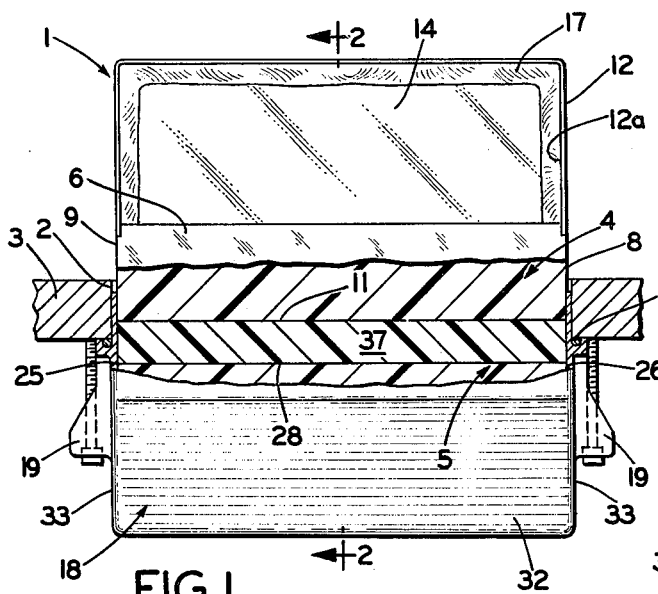
FIG. 1 is a front elevational view of the improved periscope construction mounted on a portion of a vehicle with portions broken away and in section, showing the optical adhesive-filled shock isolation gap.
Figure 2:
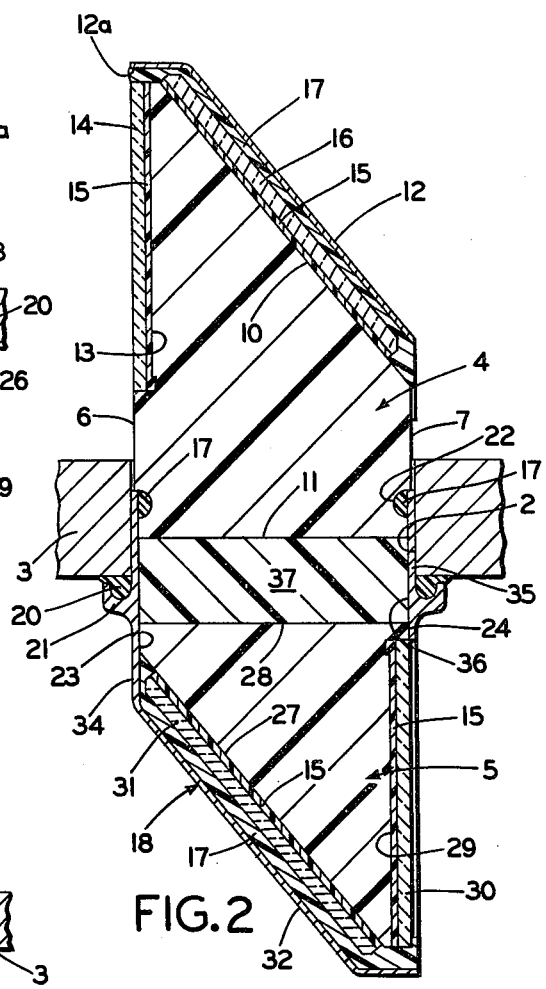
FIG. 2 is an enlarged vertical sectional view taken on line 2—2, FIG. 1.

One form of the improved ballistic protected periscope construction is indicated generally at 1, and is shown particularly in FIGS. 1 and 2, mounted within an opening 2 of a section of armor plate 3. Periscope 1 includes a pair of transparent blocks 4 and 5 formed of a clear plastic material of optical quality, such as methyl methacrylate. Upper block 4 is referred to as the object viewing section and is located substantially exterior of the armored vehicle with block 5 being referred to as the eyepiece viewing section and is located substantially within the interior of the vehicle.

Block 4 preferably has a generally prismatic shape formed with opposed parallel front and rear planar surfaces 6 and 7, and a pair of opposed parallel planar end surfaces 8 and 9. Front and rear surfaces 6 and 7 are connected by an angled top surface 10 and a bottom surface 11. Front surface 6 is formed with a vertically extending recessed object viewing surface 13 having a clear window glass 14 mounted thereon by a clear optical adhesive 15. A reflective mirror 16 is mounted on angled top surface 10 by optical adhesive 15. Block 4 is contained within a protective housing cover 12 and is secured therein by a sealing adhesive 17. Housing cover 12 is formed with a window opening 12a which aligns with object viewing surface 13 and glass 14.

Eyepiece viewing block 5 is contained within a protective housing cover 18 which is secured to armor plate 3 by a pair of end mounting lugs 19. A rectangular rubber sealing gasket 20 is mounted between armor plate 3 and a gasket receiving flange 21, formed on housing 18 for effectively sealing armor plate opening 2. The upper end of housing cover 18 is sealed with and secured to upper transparent block 4 by a peripheral groove 22 formed in block 4 which is filled with sealing adhesive 17.

Eyepiece block 5 (FIG. 2) has a generally prismatic shape similar to block 4, and includes opposed parallel front and rear planar surfaces 23 and 24 and a pair of opposed planar end surfaces 25 and 26. An angled planar surface 27 and a planar top surface 28 extend between surfaces 23-26 to complete the shape of block 5. Block 5 includes a vertically extending eyepiece viewing surface 29 having a clear window glass 30 mounted thereon by optical adhesive 15. A mirror 31 is mounted on angled surface 27 by optical adhesive 15. Block 5 is mounted within housing cover 18 by sealing adhesive 17 which bonds bottom block 5 to angled wall 32, side walls 33, and front and rear walls 34 and 35 of housing cover 18.

Bottom surface 11 of object viewing block 4 is spaced from surface 28 of eyepiece viewing block 5 forming a void 36 therebetween. Void 36 preferably extends throughout the length and width of blocks 4 and 5 between front and rear walls 34 and 35 and side wall 33 of housing cover 18, as shown in FIGS. 1 and 2. In accordance with the invention, void 36 is filled with a single layer of optical adhesive, cushioning material 37. One type of material which has been found satisfactory for use in filling void 36 is sold by the Minnesota Mining & Manufacturing Company, under its trademark "Sunweld," which is classified under the designation EC-2019. This adhesive is a polymerizing synthetic resin adhesive which retains perfect clarity on aging and exposure to ultra-voilet light. It also has approximately the same refractive index as hard acrylic resin sheet. The adhesive, when cured, is soft and rubbery, similar to a very heavy gelatin substance, to provide the desired shock absorbing characteristics.

These materials remain soft and pliable throughout the required operating ranges and parameters of most periscope specifications. Likewise, the thickness of material 37 may vary depending upon the specific design, shape and configuration of the periscope. In particular, the thickness depends upon the size of the transparent blocks 4 and 5 since greater the lengths of the blocks, greater will be the shock dampening effect thereof, thereby requiring a thinner adhesive layer 37 than for shorter length blocks 4 and 5. Material 37 preferably has a range of thicknesses between 0.002 inches and 1 inch. Material 37 provides a shock isolating zone or gap between the transparent blocks as well as providing a mechanical bonding for securing and connecting the blocks in their spaced relationship.

A shock wave is generated in upper block 4 upon object viewing surface 13 and window glass 14 being struck by a projectile. The shock wave is transmitted downwardly through solid block 4 and would be transmitted into solid block 5 causing pieces and bits of glass 30 and of body 5 to fly into the face of an observer looking through the periscope, were it not for the layer of shock isolating material 37.

Second Embodiment

Figure 3:
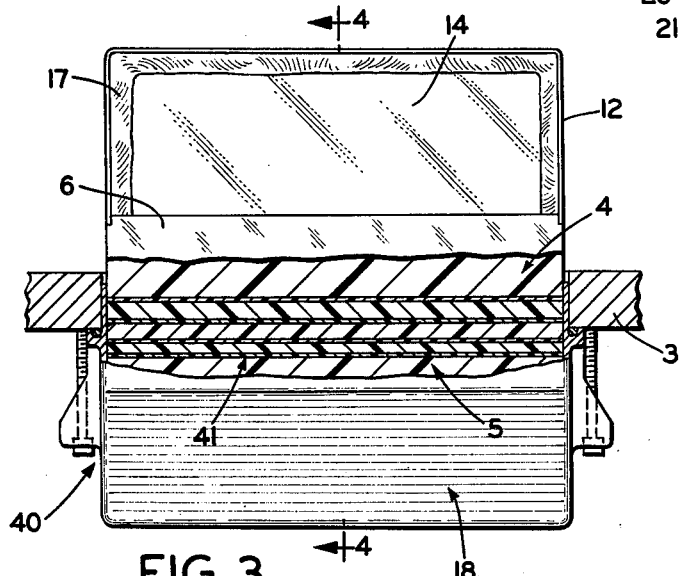
FIG. 3 is a front elevational view similar to FIG. 1 with portions broken away and in section, showing a second embodiment of the improved periscope in which the shock isolation gap is filled with a shock reducing laminate.
Figure 4:
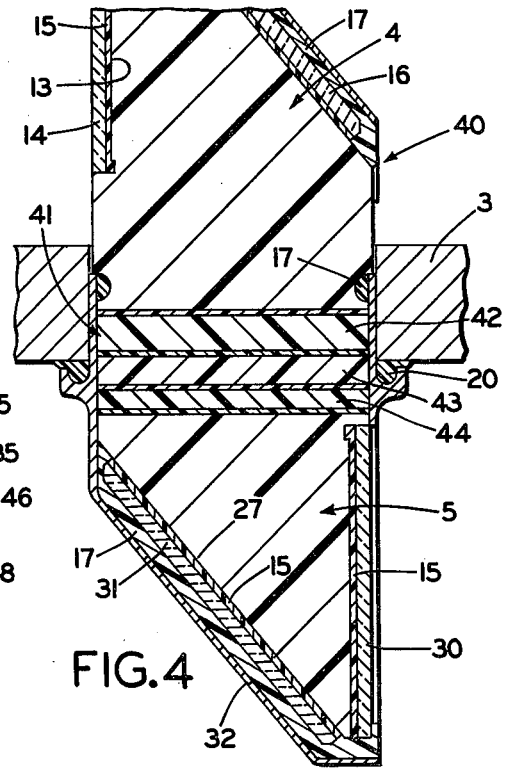
FIG. 4 is an enlarged fragmentary sectional view similar to FIG. 2, taken on line 4—4, FIG. 3.
Figure 5:
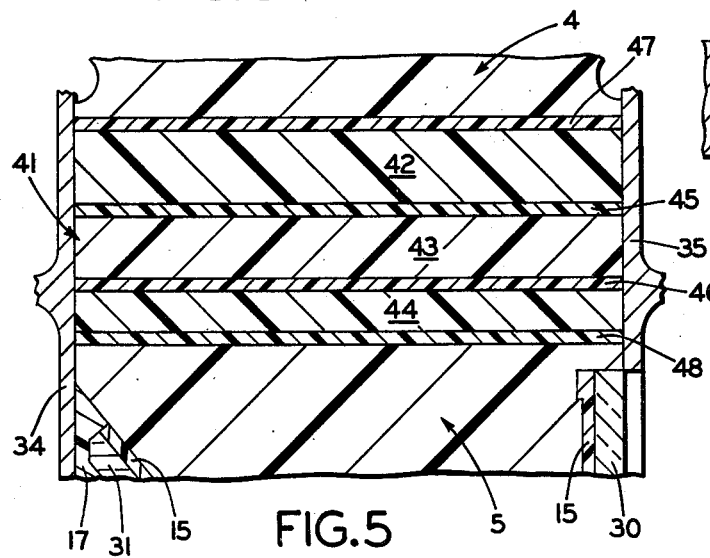
FIG. 5 is a greatly enlarged fragmentary sectional view of the shock absorbing laminate of FIG. 4.

Another form of the improved ballistic protected periscope construction is shown in FIGS. 3, 4 and 5, and is indicated generally at 40. Periscope construction 40 is similar to periscope 1 except the single layer of shock absorbing adhevise cushioning material 37 is replaced by a laminate, indicated generally at 41. Laminate 41 includes a plurality of blocks or strips of transparent material, three of which are shown in the drawing which are indicated at 42, 43 and 44. Blocks 42-44 may be of the same transparent material as are blocks 4 and 5, or may be formed of a clear polycarbonate or a clear plexiglass material without affecting the concept of the inveniton. Likewise, the thicknesses of the individual blocks 42-44 may vary, as shown in FIG. 5.

Blocks 42, 43 and 44 are separated by intervening layers of cushioning material 45 and 46 which is the same type of adhesive cushioning material as is material 37. Likewise, outer blocks 42 and 44 are separated from and secured to upper and lower blocks 4 and 5 by additional layers of similar cushioning material 47 and 48, respectively. Layers 45-48 preferably have thicknesses in the range of from 0.040 inches to 0.125 inches in forming laminate 41. Again, the particular thicknesses of cushion layers 45-48, as well as laminate blocks 42-44 depend upon the particular design and construction of blocks 4 and 5 and the degree of ballistic protection desired.

A plurality of various laminates 41 may be formed separately from the remaining components of the periscopes and selectively assembled with blocks 4 and 5 prior to or at the same time as blocks 4 and 5 are assembled and sealed within protective housing covers 12 and 18. Surfaces 11 and 28 of blocks 4 and 5 need not be extended perpendicular to end surfaces 6-7 and 13-24, respectively, as shown, but may be angled and parallel to surfaces 10 and 27, or at various angles therebetween. Likewise, surfaces 11 and 28 need not be parallel to each other although such parallelism is preferred to achieve the desired shock isolation.

IN GENERAL

Accordingly, improved periscope constructions 1 and 40 provide a gap or void which is filled with a shock absorbing, cushioned, optical adhesive material within the interior of the periscope and concealed within the protective housing, and which is unaffected by the harsh environment to which the periscopes are subjected when mounted on a vehicle; provides a construction which enables a wide range of shock absorbing characteristics to be achieved by varying the thickness of the single layer of cushioning material 37, or by increasing or decreasing the number of laminate blocks 42-44 and the thicknesses of the intervening laminate strips 45-48 of cushioning material; provides a periscope construction which eliminates the need for an expensive and maintenance prone air seal as in prior constructions, using a gas filled shock isolation zone, yet which achieves the same desirable shock absorbing characteristics; and provides such a periscope structure which is of an extremely simple, rugged and inexpensive configuration, which eliminates difficulties encountered with prior devices, achieves the objectives indicated and solves problems existing in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved ballistic protected periscope construction is constructed and used, the characteristics of the construction, and the advantageous, new and useful results obtained; the new and useful structures, devices, elements, arrangements, parts, and combinations, are set forth in the appended claims.

I claim:

1. A periscope construction of the type having a protective housing and an optical system mounted within the housing, in which the optical system includes:
    a. a first transparent block of material forming an object viewing section having an object viewing surface a first reflective surface and a first end surface;
    b. a second transparent block of material forming an eyepiece viewing section having an eyepiece viewing surface, a second reflective surface, and a second end surface;
    c. said first and second transparent blocks being mounted at generally opposite ends of the protective housing, with the first and second reflective surfaces and the object and eyepiece viewing surfaces being generally parallel with respect to each other, respectively, and forming a parallelogram in cross section;
    d. the first and second end surfaces being spaced from each other and forming a void therebetween, said void being located within the protective housing and generally intermediate the reflective surfaces;
    e. shock absorbing means mounted within and filling the void between the first and second end surfaces of the blocks to reduce the transmission of shock waves between said blocks when the first block is struck by a projectile; and
    f. said shock absorbing means including a layer of soft and pliable optical adhesive which bonds the blocks together and which remains in a soft, rubbery, heavy gelatin state.

2. The construction defined in claim 1 in which the shock absorbing means includes first and second layers of the optical adhesive and an intervening transparent block; and in which said first and second layers are bonded to the first and second end surfaces, respectively, and to opposite sides of said intervening block.

3. The construction defined in claim 1 in which the shock absorbing means further includes a laminate having a plurality of intervening transparent blocks and a plurality of intervening layers of the optical adhesive; in which said adhesive layers bind the intervening blocks together and to the first and second transparent blocks; and in which the laminate fills the void formed between said first and second blocks.

4. The construction defined in claim 1 in which the first and second end surfaces are generally planar and parallel to each other; and in which the separation between said surfaces and the corresponding thickness of the optical adhesive is in the range of 0.002 inches to 1.00 inch.

5. The construction defined in claim 3 in which the intervening layers of the optical adhesive are in the range of 0.040 inches to 0.125 inches.

6. The construction defined in claim 4 in which the first and second parallel end surfaces extend across the housing normal to an axis of sight of the optical system which extends between the reflective surfaces.

* * * * *